United States Patent
Drake

(10) Patent No.: US 11,689,463 B1
(45) Date of Patent: Jun. 27, 2023

(54) REDUCED TRAVERSAL FOR CONSISTENT HASHING FOR PACKET FLOW LOAD BALANCING

(71) Applicant: Juniper Networks, Inc., Sunnyvale, CA (US)

(72) Inventor: John E. Drake, Pittsburgh, PA (US)

(73) Assignee: Juniper Networks, Inc., Sunnyvale, CA (US)

( * ) Notice: Subject to any disclaimer, the term of this patent is extended or adjusted under 35 U.S.C. 154(b) by 135 days.

(21) Appl. No.: 16/883,583

(22) Filed: May 26, 2020

(51) Int. Cl.
   *H04L 45/7453* (2022.01)
   *H04L 47/125* (2022.01)

(52) U.S. Cl.
   CPC ........ *H04L 45/7453* (2013.01); *H04L 47/125* (2013.01)

(58) Field of Classification Search
   CPC .................. H04L 45/7453; H04L 47/125
   See application file for complete search history.

(56) References Cited

U.S. PATENT DOCUMENTS

| | | | |
|---|---|---|---|
| 8,259,585 B1 | 9/2012 | S P et al. | |
| 8,630,294 B1 | 1/2014 | Keen et al. | |
| 10,348,603 B1 * | 7/2019 | Singh | H04L 45/7453 |
| 10,938,668 B1 * | 3/2021 | Zulak | H04L 47/125 |
| 2016/0149812 A1 * | 5/2016 | Li | H04L 47/12 370/392 |
| 2016/0350226 A1 * | 12/2016 | Agarwal | G06F 12/0868 |
| 2020/0084269 A1 * | 3/2020 | Husar | H04L 45/7453 |
| 2021/0271711 A1 * | 9/2021 | Schlegel | G06F 16/9014 |

* cited by examiner

*Primary Examiner* — Donald L Mills
(74) *Attorney, Agent, or Firm* — Shumaker & Sieffert, P.A.

(57) ABSTRACT

In general, techniques are described for reducing traversal when performing consistent hashing for packet flow load balancing. A computing device comprising a memory and a processor may be configured to perform the techniques. The memory may store a hash ring that includes a plurality of buckets, where a non-zero subset of the plurality of buckets each includes a different output value of a plurality of output values, and a remaining subset of the plurality of buckets each includes an empty value. The processor may prepopulate the remaining subset of the plurality of buckets with the respective different output value of the plurality of output values. The processor may receive a key value, and apply a hash function to the key value to identify a bucket of the plurality of buckets. The processor may next output the output value associated with the identified bucket.

19 Claims, 9 Drawing Sheets

REDUCED TRAVERSAL FOR CONSISTENT HASHING FOR PACKET FLOW LOAD BALANCING

TECHNICAL FIELD

This disclosure relates to consistent hashing for computing devices, such as routers, switches, service gateways or load balancers.

BACKGROUND

Network devices forward packet via different paths, which are referred to as routes, through a network. Network devices, such as routers, switches, service gateways, and/or load balancers may attempt to balance distribution of packets corresponding to a same flow (as identified by a so-called five-tuple comprising a destination address, a source address, a destination port, a source port, and a protocol) across different routes to thereby potentially better utilize available capacity within the network and prevent packets from being dropped. That is, there may exist two or more routes within a network that reaches the same destination. A router may select one route (to a destination) for one particular packet flow and another route (to the same destination) for a different packet flow. While described with respect to routes, network devices may perform load balancing across links, next hops, servers, or any other type of network resource.

SUMMARY

In general, this disclosure describes techniques for utilizing consistent hashing for load-balancing packet flows and, in particular, reducing traversal operations associated with applying consistent hashing in a data plane of a network device. Rather than perform lazy output value population and depopulation in which the computing device, such as a router, updates empty buckets in a hash ring with new output values and removes old output values from the hash ring, the computing device may prepopulate empty buckets with output values to reduce or potentially eliminate traversal of empty buckets. In other words, the computing device may populate existing output values stored to buckets to adjacent (either clockwise or counterclockwise) empty buckets until encountering another non-empty bucket having an output value. In response to a key value, the computing device may apply the hash function to the key value to identify a bucket of the hash ring (which has been pre-populated by the computing device). The computing device may return the prepopulated output value without potentially having to traverse any additional buckets.

As such, various aspects of the techniques described in this disclosure may enable more efficient operation of the computing device itself. For example, in contexts in which the output values change frequently, such as routing contexts where routing updates occur frequently for advertising changing routes, pre-population for consistent hashing may reduce or possibly eliminate traversal of empty buckets, resulting in improved computing performance (in terms of processor cycles consumed, memory bandwidth, caching space consumed, etc.). Improved computing performance may also reduce power consumption, heat generation, etc.

In one example, various aspects of the techniques are directed to a method comprising: generating, by a computing device, a hash ring that includes a plurality of buckets, wherein a non-zero subset of the plurality of buckets each includes a different output value of a plurality of output values, and a remaining subset of the plurality of buckets each includes an empty value; prepopulating, by the computing device, the remaining subset of the plurality of buckets with the respective different output value of the plurality of output values; receiving, by the computing device, a key value; applying, by the computing device, a hash function to the key value to identify a bucket of the plurality of buckets; and outputting, by the computing device, the output value associated with the identified bucket.

In another example, various aspects of the techniques are directed to a computing device comprising: a memory configured to store a hash ring that includes a plurality of buckets, wherein a non-zero subset of the plurality of buckets each includes a different output value of a plurality of output values, and a remaining subset of the plurality of buckets each includes an empty value; and one or more processors configured to: prepopulate the remaining subset of the plurality of buckets with the respective different output value of the plurality of output values; receive a key value; apply a hash function to the key value to identify a bucket of the plurality of buckets; and output the output value associated with the identified bucket.

In another example, various aspects of the techniques are directed to a non-transitory computer readable storage medium having stored thereon instructions that, when executed, cause one or more processors to: obtain a hash ring that includes a plurality of buckets, wherein a non-zero subset of the plurality of buckets each includes a different output value of a plurality of output values, and a remaining subset of the plurality of buckets each includes an empty value; prepopulate the remaining subset of the plurality of buckets with the respective different output value of the plurality of output values; receive a key value; apply a hash function to the key value to identify a bucket of the plurality of buckets; and output the output value associated with the identified bucket.

In another example, various aspects of the techniques are directed to a network device comprising: a plurality of interface cards; a packet forwarding engine configured to: store a hash ring that includes a plurality of buckets, wherein a non-zero subset of the plurality of buckets each includes a different output value of a plurality of output values that each identify a different one of the plurality of interface cards, and a remaining subset of the plurality of buckets each includes an empty value; and prepopulate the remaining subset of the plurality of buckets with the respective different output value of the plurality of output values; receive a packet; apply a hash function to the packet to identify a bucket of the plurality of buckets; and forward the packet to an interface card of the plurality of interface cards using the different output value stored to the identified bucket to load balance the packet across the plurality of interface cards.

The details of one or more examples are set forth in the accompanying drawings and the description below. Other features, objects, and advantages will be apparent from the description and drawings, and from the claims.

DETAILED DESCRIPTION

As described herein, hash tables are generally used for providing a unique mapping between a set of input values, referred to as key values, and storage locations for corresponding output values, referred to as buckets. Hash tables are used in various contexts, such as, for example, database applications, implementing data structures such as associative arrays and sets, memory caches, networking applications, or other situations in which a unique mapping between input key values and output values is desirable.

One drawback to hash tables, as recognized herein, is that removal or addition of buckets generally requires a remapping of the key values to the buckets. In some contexts, such as network contexts in which hash tables are used to load balance flows across routes and/or servers (e.g., a content delivery network—or CDN), remapping the key values to the buckets may occur frequently and thereby result in consumption of computing resources, such as processor cycles, memory, and/or memory bus bandwidth. In other words, so-called scaled hashing may experience issues when performing bucket scaling.

So-called consistent hashing corrects for bucket scaling by over allocating buckets in excess of expected bucket demand. The consistent hashing algorithm may instantiate the hash table as a so-called hash ring representative of the allocated buckets, and map each output value to a subset of the available over allocated buckets. The hash is then applied to a key value, which may result in mapping the key value to an empty bucket. When encountering the empty bucket, the consistent hash algorithm may walk the hash ring (either clockwise or counterclockwise) until a populated bucket is reached. The hashing algorithm may output the populated bucket output value as a match for the key value. As the buckets are overallocated in terms of expected demand, the buckets may be added or removed in the hash ring and thereby avoid remapping or other costs associated with scaled hashing.

Figure 1:
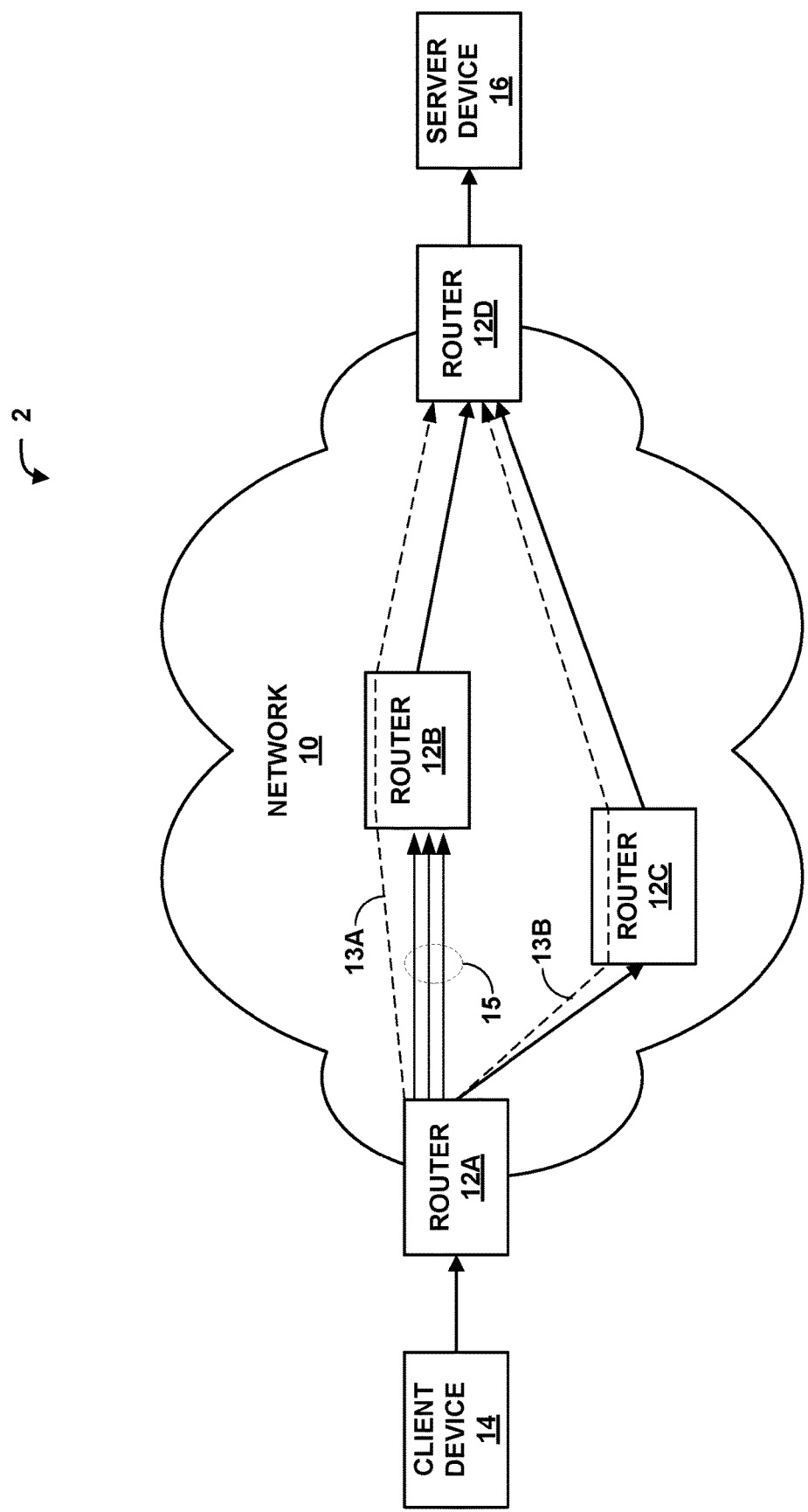
FIG. 1 is a block diagram illustrating an example system including a variety of network devices, any of which may implement hashing techniques of this disclosure.

FIG. 1 is a block diagram illustrating an example system 2 including a variety of network devices, any of which may implement hashing techniques of this disclosure. The example of FIG. 1 includes client device 14 and server device 16, which communicate via network 10. Network 10 includes routers 12A-12D (routers 12). In other examples, additional or alternative network devices, such as gateways, switches, hubs, security devices, servers, databases, printers, or other devices may be present in system 2, any or all of which may implement the hashing techniques of this disclosure.

Client device 14, in this example, represents a device that submits requests for services to server device 16. Server device 16, likewise, represents an example of a device that provides services to client device 14 in response to requests. Client device 14 and server device 16 may also participate in a bidirectional communication session, in which server device 16 requests services from client device 14, and client device 14 provides the requested services to server device 16. In this manner, client device 14 and server device 16 can each act as both a server and a client. Client device 14 may represent an endpoint device, such as a mobile device (e.g., a laptop computer, tablet computer, or cellular phone), a personal computer, a computing terminal, an Internet-capable television or device for providing Internet-based television services, or other such devices. Server device 16 may represent a web server, a file server, a peer device (e.g., another user's computing device), a database server, a print server, or other device from which a client device requests services.

Client device 14 submits requests to server device 16 via network 10. In particular, in this example, client device 14 is communicatively coupled to router 12A. In other examples, client device 14 may be communicatively coupled to router 12A via additional network devices, such as access lines, wireless infrastructure and backhaul networks, and the like. Routers 12 of network 10 are configured to determine routes through network 10 to reach various destinations, such as server device 16. Routers 12 implement routing protocols to determine routes through network 10, as well as to share determined routes with other routers 12.

In the example of FIG. 1, router 12A determines that two routes exist to reach server device 16. A first route beginning at router 12A to reach server device 16 includes router 12B, router 12D, and server 16. A second route beginning at router 12A to reach server device 16 includes router 12C, router 12D, and server 16. In general, router 12A includes a control plane that executes routing protocols to determine the topology of network 10 and to select one of these routes over the other. Upon receiving a packet of data from client device 14 destined for server device 16, a data plane of router 12A performs a lookup function on keying information (e.g., a five-tuple that includes a source Internet protocol—IP—address, a destination IP address, a source port, a destination port, and a protocol) within the packet and forwards the data along the selected route.

In some examples, router 12A stores routing information for known routes in one or more routing tables or other data structures, also referred to as a routing information base (RIB). The control plane of router 12A generates forwarding information based on the routing tables in the form of one or more forwarding tables or other data structures, also referred to as a forwarding information base (FIB), and programs the data plane in accordance with the forwarding information. The FIB stores network addresses or other keying information (e.g., MPLS labels) and maps the keying information with particular logical or physical network interfaces of router 12A. Upon receiving a packet of data from client device 14, router 12A can determine a network interface through which to send the packet based on the keying information of the packet such that the packet ultimately reaches, for example, a destination address specified in the packet. In one example, the data plane of router 12A includes a packet forwarding engine having dedicated application-specific integrated circuits that are programmed in accordance with the FIB for forwarding network traffic.

In some examples, the forwarding engine implements a longest prefix match algorithm when forwarding an individual packet to identify an entry of the FIB that best matches the destination address of the packet. For example, the FIB typically stores network addresses in the form of network prefixes that are reachable through other routers within the network. As one example, router 12A may not necessarily learn the specific network address of individual server device 16 (e.g., 10.1.1.101), but instead may learn that a network prefix (i.e., a range of addresses) are reachable through router 12D (e.g., network prefix 10.1/16). In general, the forwarding engine of router 12A uses the longest prefix match algorithm to determine the entry in the FIB having the longest prefix that matches the destination address of a received packet. Router 12A forwards the received packet through the network interface specified in the entry of the FIB identified as storing the longest matching prefix that is satisfied by the destination address of the received packet.

One drawback to hash tables is that removal or addition of buckets generally requires a remapping of the key values to the buckets. In some contexts, such as network contexts in which hash tables are used to load balance flows across routes, links, next hops, servers (e.g., a content delivery network—or CDN) and or across any other type of network resource, remapping the key values to the buckets may occur frequently and thereby result in consumption of computing resources, such as processor cycles, memory, and/or memory bus bandwidth. In other words, so-called scaled hashing may experience issues when performing bucket scaling.

For example, referring to FIG. 1, router 12A may perform load balancing across routes 13A and 13B, applying a hash table using a destination address specified in each flow as a key to obtain an output value (e.g., a next hop associated with either route 13A or 13B). Router 12A may perform so-called hashing to implement equal cost multi-path (ECMP) across routes 13A and 13B.

As another example, router 12A may also perform load balancing, either in addition to or as an alternative to route-based load balancing, across multiple links 15 coupling router 12A to router 12B. That is, multiple links may be used between routers 12A and 12B to increase capacity, provide for redundancy (and thereby promote so-called high availability), and the like. Router 12A may apply the hash table using the so-called five-tuple (e.g., a source address, a destination address, a source port, a destination port, and a protocol) of each packet flow as a key to obtain an output value (e.g., a next hop associated with each of links 15). Although described with respect to multiple links between two routers, router 12A may perform load balancing in other situations where multiple links are between more than two routers (such as situations supported by a link aggregation control protocol—LACP).

As yet another example, router 12A may utilize load balancing internally to load balance packet switching and thereby fully utilize the internal switching fabric and promote more efficient packet forwarding. That is, router 12A may apply a hash table using packet information to load balance packets across internal switch nodes (e.g., a first packet forwarding engine may switch packets to a second packet forwarding engine for output via an interface card).

In these situations, router 12A may frequently add and remove buckets from the hash table. When removing these buckets, router 12A may remap the input values to the output values, which may occur frequently in the foregoing load balancing situations in a dynamic network in which links, routes, and/or routers 12 may fail or otherwise cease proper operation. As such, scaled hashing may experience issues when performing bucket scaling. So-called consistent hashing corrects for bucket scaling by over allocating buckets in excess of expected bucket demand. The consistent hashing algorithm may instantiate the hash table as a so-called hash ring representative of the allocated buckets, and map each output value to a subset of the available over allocated buckets. The hash is then applied to a key value, which may result in mapping the key value to an empty bucket. When encountering the empty bucket, the hash unit may walk the hash ring (either clockwise or counterclockwise) until a populated bucket is reached. The hash unit may output the populated bucket output value as a match for the key value. As the buckets are overallocated in terms of expected demand, the hash unit may populate empty buckets in the hash ring with output values and thereby avoid remapping or other costs associated with scaled hashing.

In accordance with the techniques if this disclosure, router 12A may perform pre-population of output values to reduce or possibly eliminate traversal of the consistent hash ring. Rather than perform lazy output value population and depopulation in which router 12A updates empty buckets in a hash ring with new output values and removes old output values from the hash ring to create empty buckets, router 12A may prepopulate empty buckets with output values to reduce or potentially eliminate traversal of empty buckets. In other words, router 12A may populate existing output values stored to buckets to adjacent (either clockwise or counterclockwise) empty buckets until encountering another non-empty bucket having an output value. Router 12A may continue for the next output value, populating that output value to adjacent empty buckets until the next bucket with an output value is encountered. Router 12A may continue in this manner until all empty buckets are prepopulated with adjacent output values stored to buckets in the hash ring. In response to a key value, router 12A may apply the hash function to the key value to identify a bucket of the hash ring (which has been prepopulated by router 12A). Router 12A may then directly return the prepopulated output value without potentially having to traverse any additional buckets.

As such, various aspects of the techniques described in this disclosure may enable more efficient operation of router 12A itself. For example, in contexts in which the output values change frequently, such as routing contexts where routing updates occur frequently for advertising changing routes, pre-population for consistent hashing may reduce or possibly eliminate traversal of empty buckets, resulting in improved computing performance (in terms of processor cycles consumed, memory bandwidth, caching space consumed, etc.). Improved computing performance may also reduce power consumption, heat generation, etc.

In operation, router 12A may obtain a hash ring that includes a pre-defined number of buckets. Router 12A may identify a hash function that maps key values to output values, where a non-zero subset of the buckets each includes a different output value of a number of different output values. The remaining subset of the buckets each includes an empty value.

Router 12A may next prepopulate the remaining subset of the buckets with the respective different output value. As noted above, router 12A may select a bucket populated with an output value and prepopulate an empty bucket adjacent (either clockwise or counterclockwise around the hash ring) to the populated bucket. Router 12A may continue in this manner prepopulating adjacent buckets until a next populated bucket of the hash ring is encountered. Upon encountering the next prepopulated bucket, router 12A may populate an adjacent empty bucket with the output value stored to the next prepopulated bucket, continuing in this manner until potentially all of the empty buckets are prepopulated.

After prepopulating the empty buckets, router 12A may receive a key value, and apply a hash function to the key value to identify one of the buckets. Router 12A may access the bucket (a single read operation) to obtain the output value associated with the identified one of the buckets. Router 12A may directly return the output value (which may have been prepopulated) after performing the single read operation. That is, router 12A may, in nearly all if not all instances, return the output value without having to traverse any empty buckets. In the context of load balancing, the key value may be a destination address associated with a packet while the output value may include an identifier to a network interface (e.g., a so-called "next hop") to which the packet should be sent.

In this respect, router 12A may perform load balancing using a hash ring and facilitate faster traversal of the hash ring through pre-population of the buckets of the hash ring. Pre-population of empty buckets with values from adjacent buckets may, as noted above, reduce traversal allowing for linear scaling for consistent hashing. That is, in so-called big-O notation, the algorithmic complexity is O(1), as there is only a single read and not N number of bucket reads potentially, thereby effectively reducing the complexity from O(N) to O(1). In contexts having rapidly changing additions and removals of output values, pre-population for consistent hashing may result in more efficient operation of the computing device itself, as less power is expended by reducing traversal of the hash ring, less memory reads are performed further reducing power and more memory bandwidth is conserved.

Although described primarily with respect to router 12A, it should be understood that the techniques of this disclosure may be implemented by any of routers 12, client device 14, server device 16, or any other computing device that would implement hashing functionality. Moreover, the hashing unit of this disclosure may be applied to other contexts and for other uses. For example, routers 12 may additionally or alternatively include one or more hashing units for implementing a Bloom filter. One example implementation of Bloom filters in network devices using hash tables is described in U.S. Patent Application Ser. No. 12/425,517, entitled "DYNAMIC LINK LOAD BALANCING," by Arun Kumar S P et al., filed Apr. 17, 2009, which is hereby incorporated by reference in its entirety. Additional details regarding the use of Bloom filters to determine whether a key value is available in forwarding information is described in co-pending U.S. Patent Application entitled "DYNAMIC BYPASS MECHANISM TO ALLEVIATE BLOOM FILTER BANK CONTENTION," by Keen et al., having Ser. No. 13/239,915, filed Sep. 22, 2011, which is hereby incorporated by reference in its entirety.

Routers 12, in some examples, use hashing units to perform packet filtering, in addition or in the alternative to the use of hashing units to implement Bloom filters. In some examples, filters specify one or more conditions and a set of actions to be performed on packets that match the conditions. In various examples, the conditions specify one or more of a source IP address, a destination IP address, a source port, a destination port, a protocol, and/or other fields of a packet.

As such, a hashing unit in accordance with the techniques of this disclosure can be used to recognize any or all of the elements of a condition, e.g., the source IP address, destination IP address, source port, destination port, protocol, or other fields of a packet. The actions to perform when the hashing unit indicates that a packet satisfies the condition of a filter may include one or more of appending a label to the packet (for multiprotocol label switching (MPLS) to tunnel the packet), removing or swapping a label on the packet, inspecting the packet for viruses, performing deep packet inspection on the packet, performing quality of service processing on the packet (e.g., prioritizing the packet over other packets), blocking or dropping the packet (e.g., when the source or destination associated with the packet have been determined to be malicious) or other services.

Client device 14 and server device 16 may also include hashing units in accordance with the techniques of this disclosure. In some examples, server device 16 comprises a database server that uses a hashing unit to map input keys into storage locations. In some examples, client device 14 comprises a cellular phone that uses a hashing unit to store a contact list (e.g., including names, telephone numbers, e-mail addresses, or other information for contacts in the contact list). These and other computing devices may also use the hashing unit of this disclosure to provide hashing functionality having prepopulated output values for consistent hashing.

Figure 2:
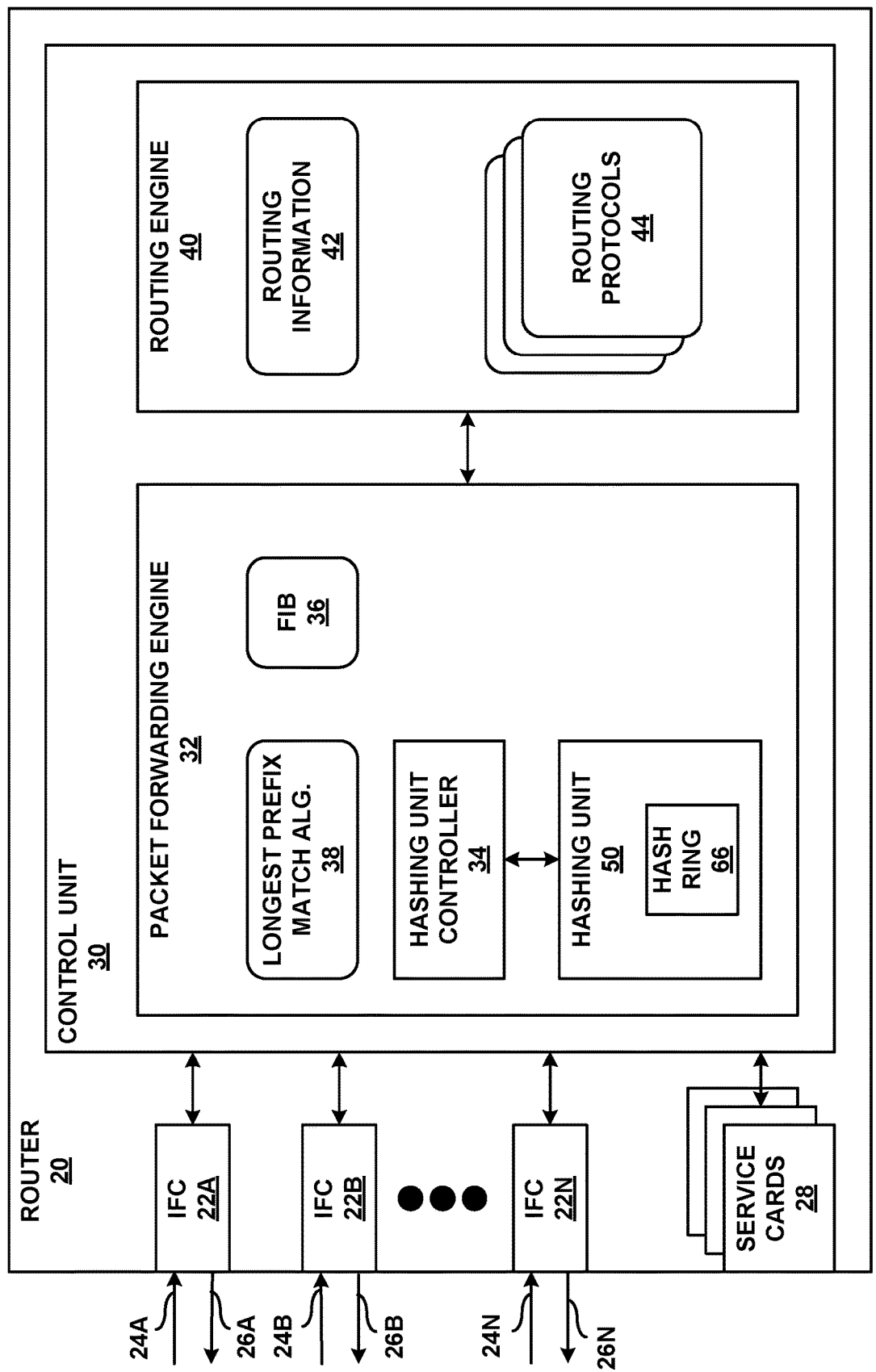
FIG. 2 is a block diagram illustrating an example router including a hashing unit that is configured according to the techniques of this disclosure.

FIG. 2 is a block diagram illustrating an example router 20 including hashing unit 50 that is configured according to the techniques of this disclosure. Router 20 may correspond to any one of routers 12 in FIG. 1, e.g., router 12A of FIG. 1. In the example of FIG. 2, router 20 includes interface cards 22A-22N (IFCs 22), service cards 28, and control unit 30. Control unit 30 includes packet forwarding engine (PFE) 32 and routing engine (RE) 40. PFE 32 includes instructions for a longest prefix match algorithm 38, a hashing unit controller 34, and hashing unit 50, which includes a hash ring 66. RE 40 includes routing information 42 and instructions for a plurality of routing protocols 44.

In other examples, RE 40 executes software that conforms substantially to the functionality of hashing unit controller 34, e.g., to add entries to and/or remove entries from hashing unit 50, as explained below. In general, hashing unit controller 34 may be implemented as hardware or software, or a combination thereof. When implemented as software, control unit 30 also provides requisite hardware for storing and executing the software, such as memory and one or more processing units. As stated above, in some examples, routing engine 40 executes software instructions for performing all or a portion of the functionality of hashing unit controller 34.

IFCs 22 receive data via respective inbound links 24A-24N (inbound links 24) and send data via outbound links 26A-26N (outbound links 26). Inbound links 24 and outbound links 26 in some examples for common IFCs form common, physical communication media for the IFCs, which operate in full duplex mode. That is, in some examples, each of IFCs 22 are coupled to respective communication media that can send and receive data substantially simultaneously. In other examples, inbound links 24 and outbound links 26 form separate physical media for respective IFCs 22.

Control unit 30 includes processing hardware and, in some examples, software and/or firmware executed by the processing hardware. In various examples, control unit 30 and the various elements thereof, e.g., PFE 32 and RE 40, are implemented in one or more processors, processing units, digital signal processors (DSPs), application specific integrated circuits (ASICs), field programmable gate arrays (FPGAs), or any combination thereof. When implemented in software or firmware, control unit 30 includes one or more processors or processing units for executing instructions for the software or firmware, as well as a computer-readable storage medium for storing the instructions. In some examples, elements of PFE 32 and RE 40 are implemented in discrete units or modules, while in other examples, PFE 32 and RE 40 are functionally integrated.

RE 40 includes instructions for one or more routing protocols 44. Routing protocols 44 include any or all of interior gateway routing protocols such as open shortest path first (OSPF), intermediate system to intermediate system (IS-IS), routing information protocol (RIP), interior gateway routing protocol (IGRP), enhanced IGRP (EIGRP), and/or exterior gateway routing protocols, such as border gateway protocol (BGP). In general, interior gateway routing protocols are used to exchange routing information between routers of an autonomous system. When network 10 (FIG. 1) forms an autonomous system, routers 12 exchange routing information according to an interior gateway routing protocol. Routers at the edge of an autonomous system, such as routers 12A and 12E (FIG. 1) exchange routing information with routers of other autonomous systems (not shown) in accordance with exterior gateway routing protocols.

In general, RE 40 executes routing protocols 44 to collect routing information and select routes from router 20 to other network devices. That is, RE 40 provides an operating environment for one or more routing protocols that exchange messages to communicate routes and/or link information. When router 20 receives a communication from another router, RE 40 receives the communication and stores the information in routing information 42 (also referred to as a routing information base). RE 40 then performs path selection to select a path from router 20 to each destination or prefix.

The selected route to reach the destination generally includes an indication of a "next hop" along the route to reach the destination. This next hop typically corresponds to a network device, such as, for example, another router, switch, gateway, or other network device along the route to reach the destination. The next hop device is connected to router 20 via one of IFCs 22. Accordingly, using the selected route to reach a destination, control unit 30 can determine the one of IFCs 22 connected to the next hop along the route to the destination and update forwarding information stored by PFE 32 to indicate the one of IFCs 22 to which to send packets destined for the destination.

More specifically, PFE 32 maintains forwarding information base (FIB) 36. Then, in response to receiving information from routing engine 40, PFE 32 updates FIB 36 to map a destination address (typically a network prefix) to a logical or physical interface associated with one of IFCs 22 based on the next hop along the route to reach the destination address.

Hashing unit controller 34 may process FIB 36 to identify next hops which are subject to load balancing and, when instantiating hash ring 66, apply the hash function to each key value associated with a corresponding next hop output value (that is subject to load balancing) defined in FIB 36 to map the next hops to buckets of hash ring 66. Assuming hash ring 66 includes more buckets than key values, hash ring 66 may include, after mapping each key value of FIB 36 to the buckets of hash ring 66, a subset of populated buckets that each includes a different next hop output value and a remaining subset of empty buckets (which refer to buckets having an empty or null value).

Hashing unit controller 34 may next prepopulate the remaining subset of empty buckets with res respective different output values stored to adjacent populated buckets (either clockwise or counterclockwise). Hashing unit controller 34 may continue to operate in this manner until all empty buckets are prepopulated. After prepopulating the empty buckets, hashing unit controller 34 may enable access to hash ring 66.

Packet forwarding engine 32 may receive packets via IFCs 22, which packet forwarding engine 32 may process according to longest prefix match algorithm 38 to identify a longest prefix match associated with the destination address.

Packet forwarding engine 32 may pass the longest prefix match to hashing unit controller 34 as a key value, which may apply the hash function to the key value to identify one of the buckets of hash ring 66. Hashing unit controller 34 may access the identified bucket (via a single read operation) to obtain the next hop output value associated with the identified one of the buckets. Hashing unit controller 34 may directly return the next hop output value (which may have been prepopulated) after performing the single read operation, providing the next hop output value to packet forwarding engine 32. Packet forwarding engine 32 may output the packet to the one of IFCs 22 identified by the next hop output value.

When PFE 32 receives an indication of a next hop to reach a network destination, PFE 32 stores an identifier for the network destination (e.g., an IP address of the network destination), along with an identifier for the one of IFCs 22 coupled to the next hop, to hashing unit 50. In some examples, hashing unit controller 34 provides an application programming interface (API) for PFE 32 and/or routing engine 40 to add data to, remove data from, and query data of hashing unit 50. In this manner, PFE 32 and/or routing engine 40 can add a new destination address, and an identifier for the corresponding one of IFCs 22, to FIB 36, stored in hashing unit 50 (which is subject to load balancing).

In some examples, PFE 32 sends the destination address and IFC identifier to hashing unit controller 34, which treats the destination address as a key value to be stored in hash ring 66. In this and other examples, hashing unit 50 provides both hardware and software interfaces for either or both of PFE 32 and routing engine 40. Management software executing on routing engine 40 adds entries to and removes entries from hashing unit 50, while hardware elements of control unit 30 perform lookup operations within hashing unit 50. In some examples, software executed by routing engine 40 adds keys to hashing unit 50 and/or removes keys from hashing unit 50.

Responsive to adding a new entry to hash ring 66, hashing unit controller 34 may interface with hash ring 66, applying the hash function to the key value (e.g., the destination address) to thereby map the next hop output value to a prepopulated bucket in hash ring 66. Hashing unit controller 34 may replace the prepopulated next hop output value of an updated bucket with the new next hop output value specified in the new entry. Hashing unit controller 34 may next identify buckets adjacent to the updated bucket (either clockwise or counterclockwise) having the prepopulated next hop output value that was just replaced, and update the adjacent bucket with the new next hop output value specified in the new entry, continuing in this manner until the next adjacent bucket specifies a value different than the prepopulated next hop output value.

At times, RE 40 determines that a route (which in this example is subject to load balancing) is either no longer available or is no longer the best route to reach a destination address. For example, RE 40 may determine that a link or a device along a selected route has failed, or that a new route has been discovered that is determined to be better for reaching a destination than a previously selected route. In any case, RE 40 may send information to PFE 32 to cause PFE 32 to remove data from hash ring 66.

Responsive to removing an entry to FIB. 36, hashing unit controller 34 may apply the hash function to the destination of the removed entry to identify the bucket storing the next hop output value of the removed entry. Hashing unit controller 34 may traverse adjacent buckets to remove the next hop output value of the removed entry associated with adjacent buckets. Hashing unit controller 34 may stop the traversal of adjacent buckets in response to determining that the adjacent bucket specifies a next hop output value different from the next hop output value of the removed entry.

Hashing unit controller 34 may then return to the bucket specifying the removed next hop output value and identify the next hop output value specified in the counter adjacent (meaning counter to the previous traversal—either counter-clockwise or clockwise) bucket and read the next hop output value specified by the counter adjacent bucket. Hashing unit controller 34 may traverse (or perform this counter traversal operation first to replace the next hop output values of the removed entry with the next hop output value of the counter adjacent bucket) the adjacent buckets to specify the next hop output value of the counter adjacent bucket (which effectively performs a prepoulation operation for an existing hash ring).

Although as described as mapping next hop output values for IFCs 22, router 20 may maps, in some instances, a destination address (and/or a source address) to one or more of service cards 28 and load balance packet flows across service cards 28. For example, router 20 may map a source domain and/or a destination domain to one of service cards 28 that performs virus detection or other malware detection services. As another example, router 20 may map a source and/or destination address to one of service cards 28 that performs a tunneling service, such as appending or swapping a label associated with a tunnel to the packet. Accordingly, PFE 32 in some examples filters fields of a received packet to determine one or more services to apply to the packet prior to forwarding the packet. Hash ring 66 may facilitate load balancing across service cards 28. After receiving the packet from service cards 28 (after services have completed), PFE 32 determines the one of IFCs 22 to which to send the serviced packet, based on data of FIB 36.

FIGS. 3A-3E are diagrams illustrating operation of a router in performing various aspects of the reduced traversal consistent hashing techniques described in this disclosure. Referring first to the example of FIG. 3A, a diagram of a conceptual hash ring 100 is shown that includes buckets 102A-102T ("buckets 102"). Hash ring 100 is one example of hash ring 66 shown in the example of FIG. 2. Hashing unit controller 34 may instantiate hash ring 100 within hashing unit 50 to facilitate rapid access to FIB. 36.

Figure 3A:
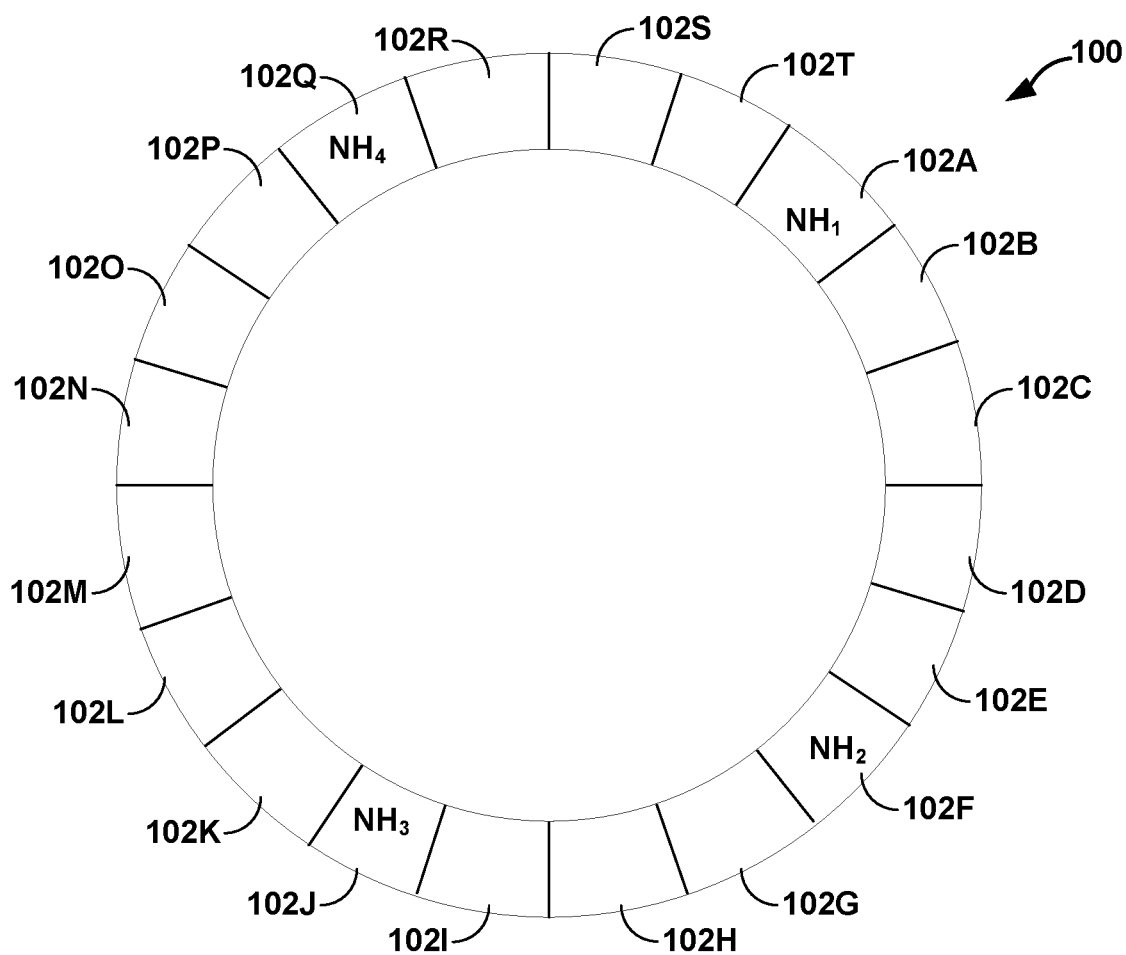
FIGS. 3A-3E are diagrams illustrating operation of a router in performing various aspects of the reduced traversal consistent hashing techniques described in this disclosure.

As further shown in the example of FIG. 3A, hashing unit controller 34 may receive four entries associating a destination address with next hop output values 1-4, which are denoted as "$NH_1$," "$NH_2$," "$NH_3$," and "$NH_4$." Hashing unit controller 34 may apply the hash function to the destination address associated with $NH_1$ to identify bucket 102A, storing $NH_1$ to bucket 102A. Hashing unit controller 34 may operate similarly with respect to "$NH_2$," "$NH_3$," and "$NH_4$" to store each respective next hop to buckets 102F, 102J, and 102Q. Buckets 102A, 102F, 102J, and 102Q may represent a non-zero subset of populated buckets denoted as "populated buckets 102." Buckets 102B-102E, 102G-102I, 102K-102P, and 102R-102T may represent a non-zero subset of remaining buckets denoted as "remaining buckets 102."

Figure 3B:
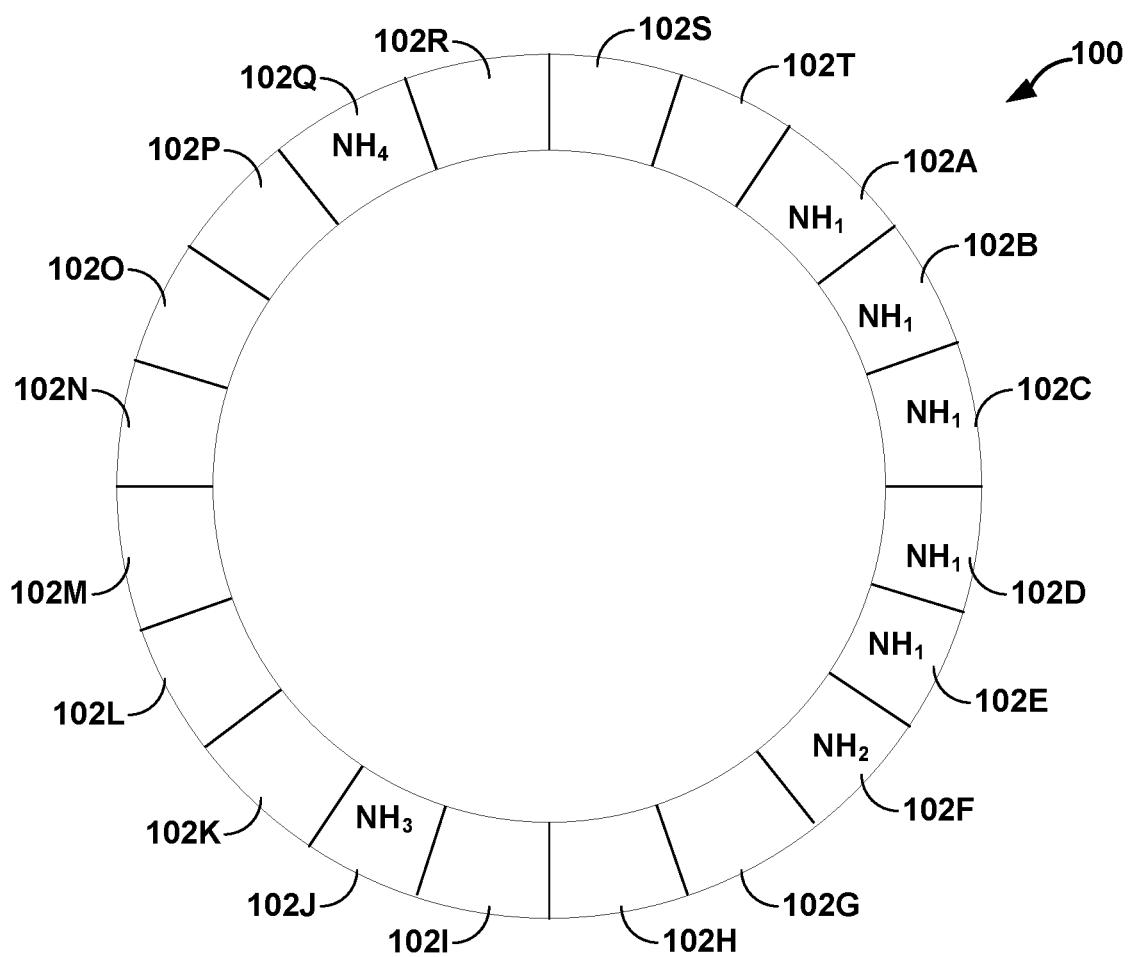

Referring next to the example of FIG. 3B, hashing unit controller 34 may prepopulate remaining buckets 102, starting in this example with prepopulated bucket 102A. Hashing unit controller 34 may traverse clockwise hash ring 100 starting at prepopulated bucket 102A. First, hashing unit controller 34 may first determine whether adjacent bucket 102B has an empty value. Responsive to determining that adjacent bucket 102B has an empty value, hashing unit controller 34 may store the output value of bucket 102A to bucket 102B, which is denoted by the "$NH_1$" in bucket 102B. Hashing unit controller 34 may continue in this manner to store $NH_1$ to buckets 102C-102E.

However, in the instance of bucket 102E, hashing unit controller 34 determines that bucket 102F has an output value of "$NH_2$." In some instances, hashing unit controller 34 may also determine whether the output value for adjacent bucket 102F is the same as the output value for adjacent bucket 102E (as conceivably hashing unit controller 34 may only include a single output value and may circle hash ring 100 endlessly without such a determination to indicate that hashing unit controller 34 should stop pre-population of output values). In any event, hashing unit controller 34 may responsive to determining that the output value of bucket 102F is different than the output value stored to bucket 102E, stop updating remaining empty buckets 102B-102E.

Figure 3C:
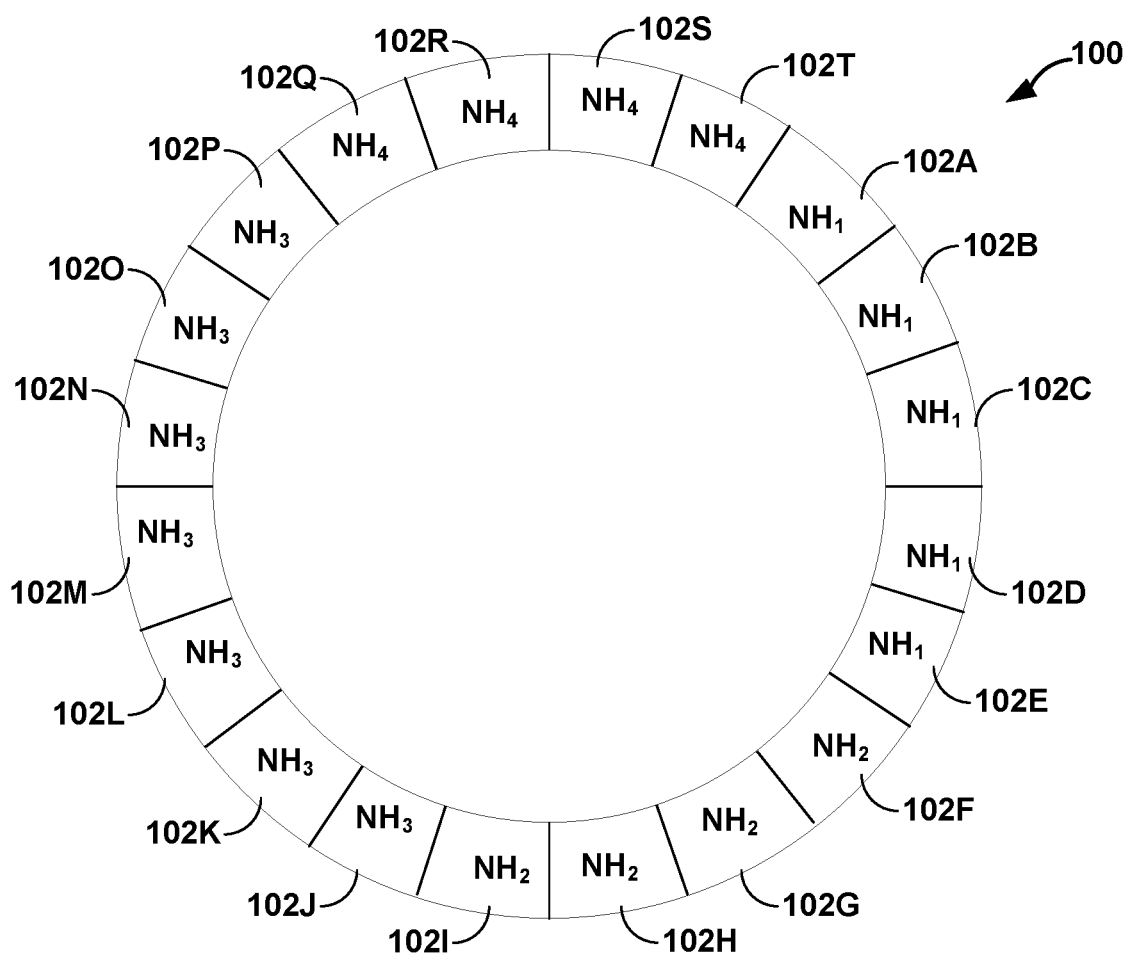

Hashing unit controller 34 may continue in this manner to traverse hash ring 100, resulting in the example of hash ring shown in FIG. 3C. In the example of FIG. 3C, hashing unit controller 34 may prepopulate $NH_2$ to each of respective buckets 102G-102I, $NH_3$ to each of respective buckets 102K-102P, and $NH_4$ to buckets 102R-102T. In this respect, hashing unit controller 34 may prepopulate empty buckets 102 through traversal of hash ring 100 in a clockwise manner. Although described with respect to clockwise traversal, various aspects of the techniques may be performed using counterclockwise traversal or other forms of traversal.

Figure 3D:
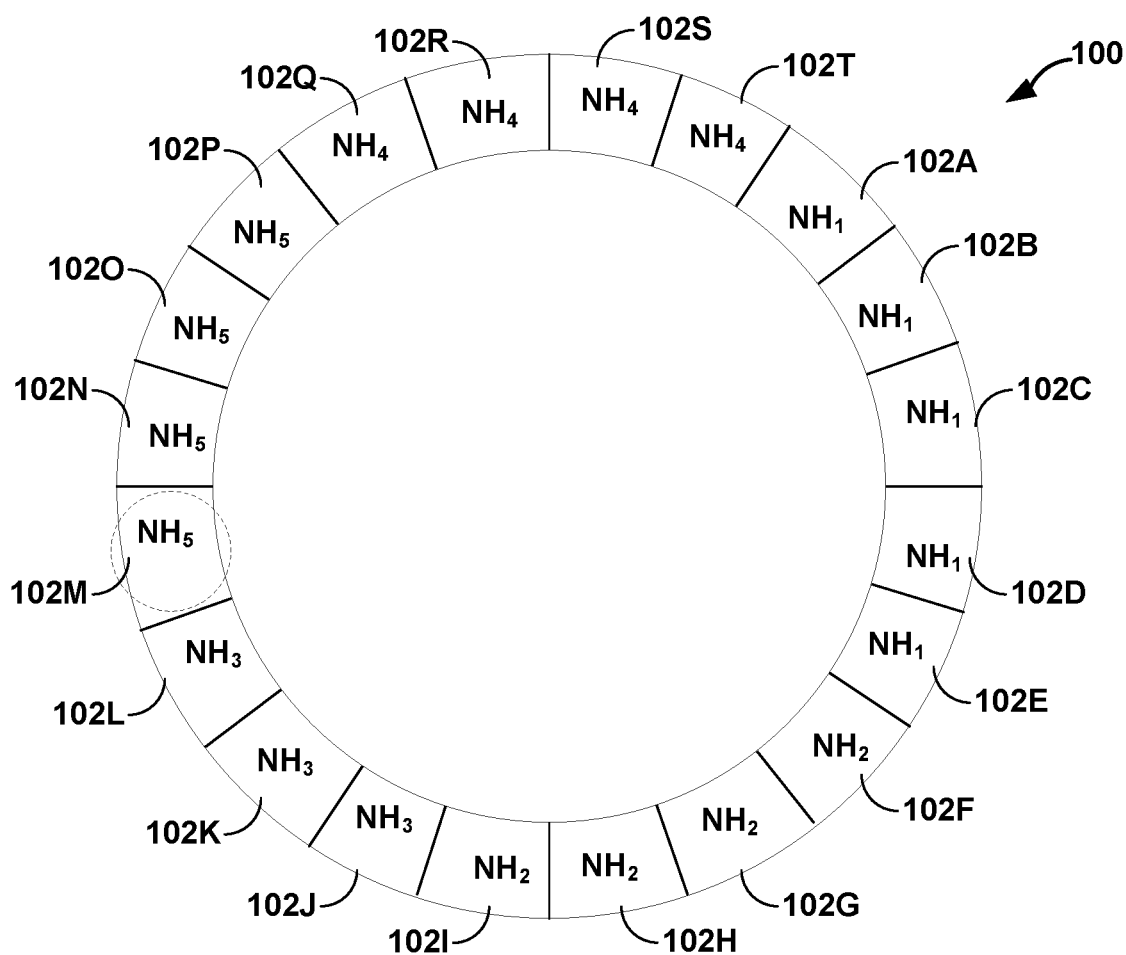

Referring next to the example of FIG. 3D, hashing unit controller 34 may receive a new entry to FIB 36, mapping a destination address to a next hop output value "$NH_5$." Hashing unit controller 34 may apply the hash function to the destination address of the new entry to identify bucket 102M as the location at which to store $NH_5$. Hashing unit controller 34 may store $NH_5$ to identified bucket 102M and then traverse hash ring 100 clockwise. As such, hashing unit controller 34 may determine whether adjacent bucket 102N has the value previously stored to bucket 102M (i.e., $NH_3$ as shown in the example of FIG. 3C) or a different output value (such as $NH_4$).

Responsive to determining that adjacent bucket 102N has the output value previously stored to bucket 102M, hashing unit controller 34 may replace the previously stored output value with the new next hop output value "$NH_5$." Hashing unit controller 34 may continue in this manner, replacing the previous stored output values with the new output value of "$NH_5$" for buckets 102O and 102P. However, for bucket 102P, hashing unit controller 34 determines that adjacent node 102Q stores an output value different than what was previously stored to bucket 102M. Responsive to determining that adjacent node 102Q stores an output value different than what was previously stored to bucket 102M, hashing unit controller 34 ends traversal of hash ring 100.

Figure 3E:
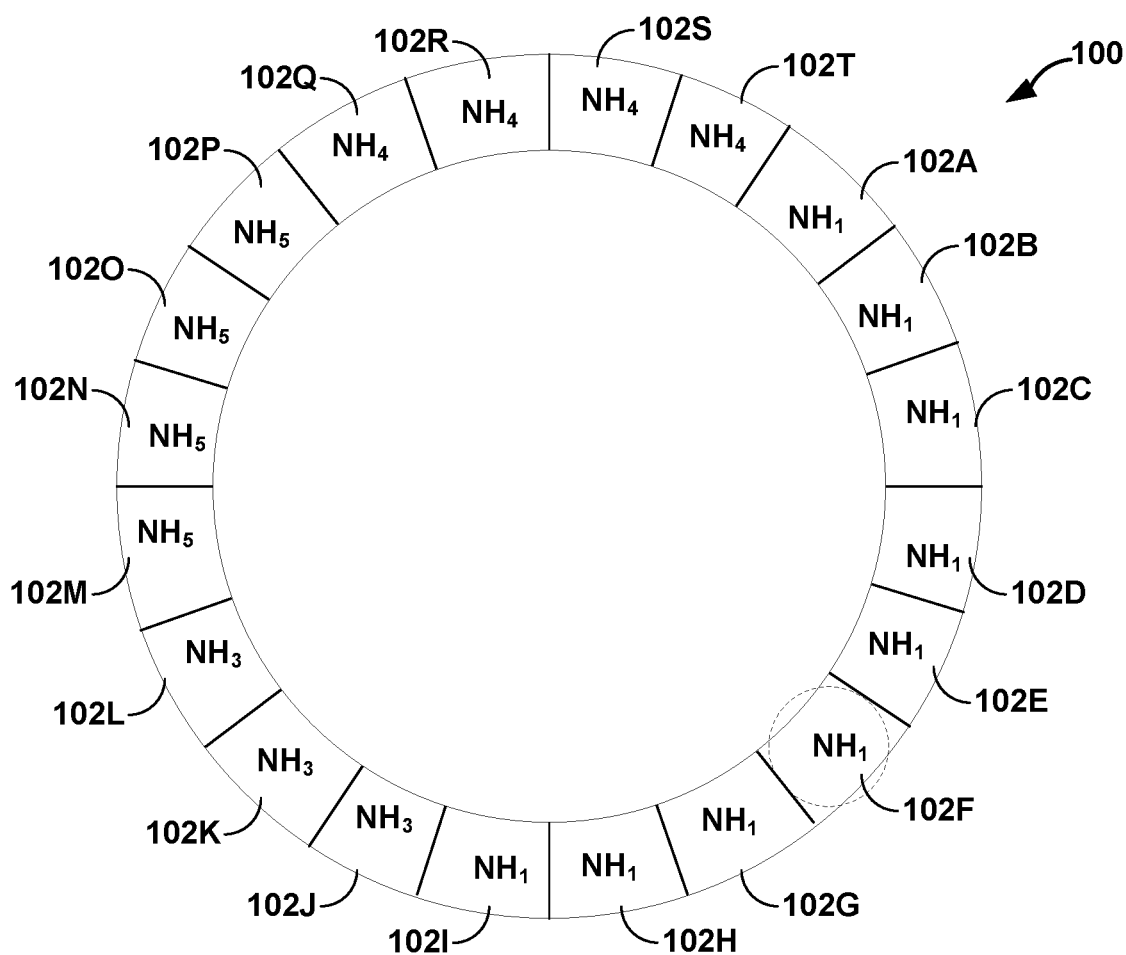

Referring next to the example of FIG. 3E, hashing unit controller 34 may receive an indication to remove an entry of FIB 36, where the indication specifies the destination address associated with the entry to be removed. Hashing unit controller 34 may apply the hash function to the destination address to identify bucket 102F as storing the output value to be removed. Hashing unit controller 34 may perform a counter traversal to identify counter adjacent bucket 102E as including the output value $NH_1$ to be used in place of the output value associated with bucket 102F. As such, hashing unit controller 34 may then traverse back to bucket 102F replacing the output value of $NH_2$ with output value $NH_1$.

Hashing unit controller 34 may next determine whether adjacent node 102G includes the output value matching the output value previously stored to bucket 102F. Responsive to determining that adjacent node 102G includes the output value matching that previously stored to bucket 102F, hashing unit controller 34 may replace the output value stored to bucket 102G with the output value of the counter adjacent bucket 102E, continuing in this manner until encountering bucket 102I. After updating bucket 102I to store the output value of counter adjacent node 102E, hashing unit controller 34 determines that adjacent node 102J stores an output value different than what was previously stored to bucket 102F. Responsive to determining that adjacent node 102J stores an output value different than what was previously stored to bucket 102F, hashing unit controller 34 ends traversal of hash ring 100.

Figure 4A:
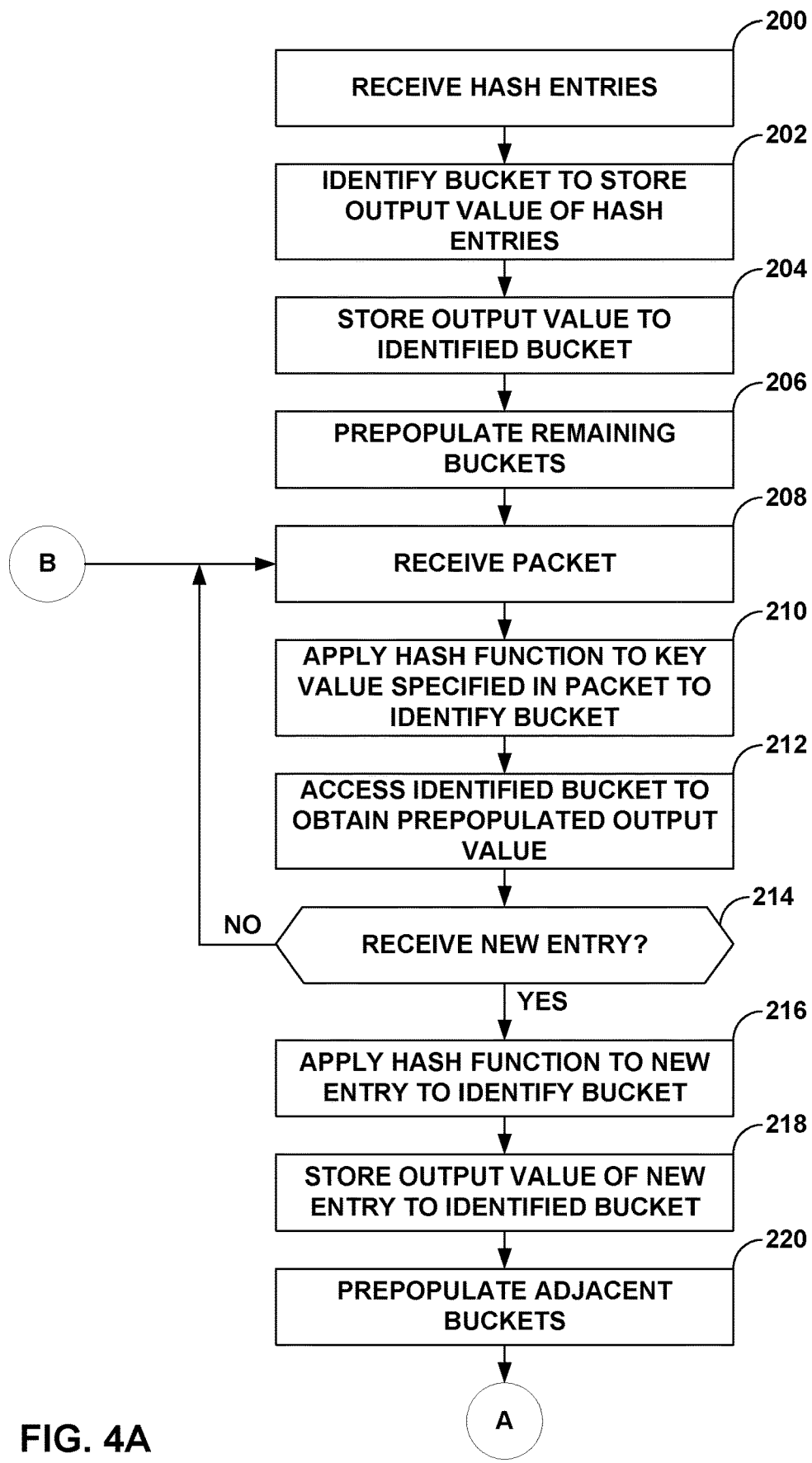
FIGS. 4A and 4B are flowcharts illustrating example operation of a computing device that may perform various aspects of the reduced traversal consistent hashing techniques described in this disclosure.
Figure 4B:
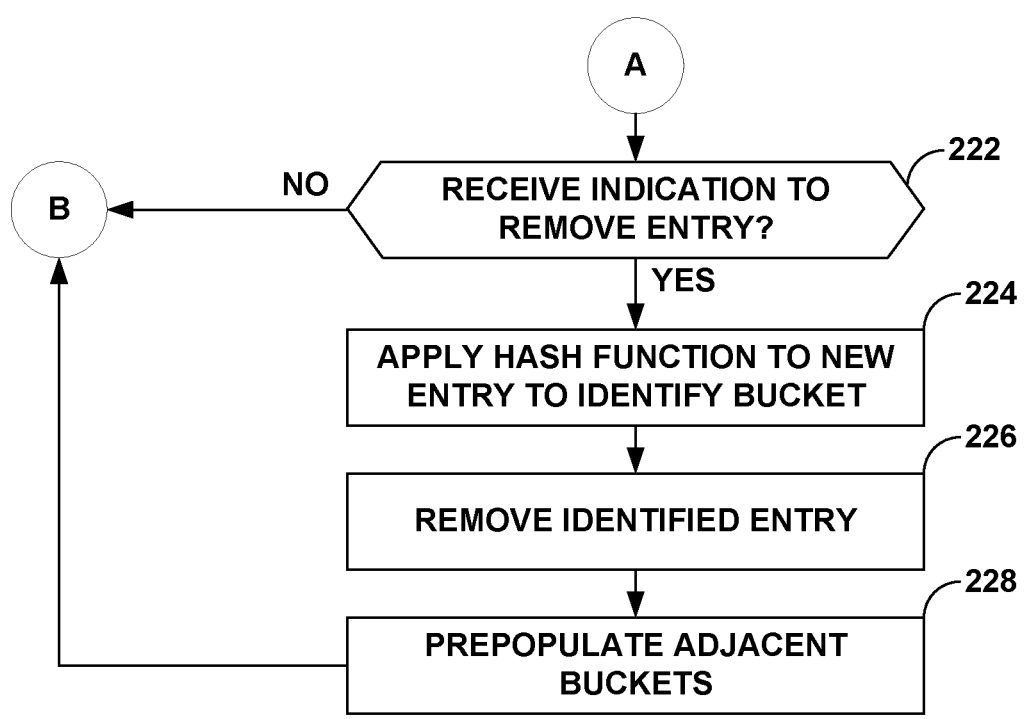

FIGS. 4A and 4B are flowcharts illustrating example operation of a computing device that may perform various aspects of the reduced traversal consistent hashing techniques described in this disclosure. A router, such as router 20 shown in the example of FIG. 2, may perform the reduced traversal consistent hashing techniques to distribute flows across various network resources (e.g., routes 12A, 12B, links 15, service cards 28, servers or other network resources). Packet forwarding engine 32 may implement hash ring 66 to, as one example, distribute packet flows across routes 12A and 12B, assigning output values as next hops as shown in the example of FIGS. 3A-3E.

As such, hashing unit controller 34 (as shown in the example of FIG. 2) may initially receive hash entries associating a destination address with next hop output values 1-4, which are denoted as "$NH_1$," "$NH_2$," "$NH_3$," and "$NH_4$" (200). Hashing unit controller 34 may apply the hash function to the destination address associated with $NH_1$ to identify bucket 102A, storing $NH_1$ to bucket 102A (202, 204). Hashing unit controller 34 may operate similarly with respect to "$NH_2$," "$NH_3$," and "$NH_4$" to store each respective next hop to buckets 102F, 102J, and 102Q (as shown in the example of FIG. 3A).

Hashing unit controller 34 may prepopulate remaining buckets 102, starting in this example with prepopulated bucket 102A (as shown in the example of FIG. 3B) (206). Hashing unit controller 34 may traverse clockwise hash ring 100 starting at prepopulated bucket 102A. First, hashing unit controller 34 may first determine whether adjacent bucket 102B has an empty value. Responsive to determining that adjacent bucket 102B has an empty value, hashing unit controller 34 may store the output value of bucket 102A to bucket 102B, which is denoted by the "$NH_1$" in bucket 102B. Hashing unit controller 34 may continue in this manner to store $NH_1$ to buckets 102C-102E. Hashing unit controller 34 may continue in this manner to traverse the remainder of hash ring 100, resulting in the example of hash ring shown in FIG. 3C.

In the example of FIG. 3C, hashing unit controller 34 may prepopulate $NH_2$ to each of respective buckets 102G-102I, $NH_3$ to each of respective buckets 102K-102P, and $NH_4$ to buckets 102R-102T. In this respect, hashing unit controller 34 may prepopulate empty buckets 102 through traversal of hash ring 100 in a clockwise manner. Although described with respect to clockwise traversal, various aspects of the techniques may be performed using counterclockwise traversal or other forms of traversal.

Hashing unit controller 34 may receive packets and apply the hash function to a destination address (or other key value) specified in a header of the packet to identify one of buckets 102 (208, 210). Hashing unit controller 34 may next access the identified one of buckets 102 to obtain, in some instances, a prepopulated output value (212).

In some instances, hashing unit controller 34 may receive a new entry to FIB 36 ("YES" 214), mapping a destination address to a next hop output value "$NH_5$" (as discussed above with respect to the example of FIG. 3D). Hashing unit controller 34 may apply the hash function to the destination address of the new entry to identify bucket 102M as the location at which to store $NH_5$ (216). Hashing unit controller 34 may store $NH_5$ to identified bucket 102M (218) and then traverse hash ring 100 clockwise to prepopulate the adjacent buckets (220). As such, hashing unit controller 34 may determine whether adjacent bucket 102N has the value previously stored to bucket 102M (i.e., $NH_3$ as shown in the example of FIG. 3C) or a different output value (such as $NH_4$).

Responsive to determining that adjacent bucket 102N has the output value previously stored to bucket 102M, hashing unit controller 34 may replace the previously stored output value with the new next hop output value "$NH_5$," thereby prepopulating the remaining adjacent buckets 102 (220). Hashing unit controller 34 may continue in this manner, replacing the previous stored output values with the new output value of "$NH_5$" for buckets 102O and 102P. However, for bucket 102P, hashing unit controller 34 determines that adjacent node 102Q stores an output value different than what was previously stored to bucket 102M. Responsive to determining that adjacent node 102Q stores an output value different than what was previously stored to bucket 102M, hashing unit controller 34 ends traversal of hash ring 100.

Referring next to the example of FIG. 4B, hashing unit controller 34 may receive an indication to remove an entry of FIB 36 (222), where the indication specifies the destination address associated with the entry to be removed. Hashing unit controller 34 may apply the hash function to the destination address to identify bucket 102F as storing the output value to be removed (224). Hashing unit controller 34 may perform a counter traversal to identify counter adjacent bucket 102E as including the output value $NH_1$ to be used in place of the output value associated with bucket 102F. As such, hashing unit controller 34 may then traverse back to bucket 102F replacing the output value of $NH_2$ with output value $NH_1$, thereby removing the identified entry (226).

Hashing unit controller 34 may next determine whether adjacent node 102G includes the output value matching the output value previously stored to bucket 102F. Responsive to determining that adjacent node 102G includes the output value matching that previously stored to bucket 102F, hashing unit controller 34 may replace the output value stored to bucket 102G with the output value of the counter adjacent bucket 102E, continuing in this manner until encountering bucket 102I. After updating bucket 102I to store the output value of counter adjacent node 102E, hashing unit controller 34 determines that adjacent node 102J stores an output value different than what was previously stored to bucket 102F. Responsive to determining that adjacent node 102J stores an output value different than what was previously stored to bucket 102F, hashing unit controller 34 ends traversal of hash ring 100 and effectively prepopulated the remaining adjacent buckets (228).

When no new entries are received ("NO" 214), indications to remove an old entry are received ("NO" 222), or after prepopulating adjacent buckets (220, 228), hashing unit controller 34 may continue to receive packets, processing the packets through application of the hash function and accessing the identified bucket to obtain prepopulated output values (in some instances) (208-212). As one example, packet forwarding engine 32 may use the next hop output value to forward each packet via one of IFCs 22 selected according to the output value obtained by hashing unit controller 34.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various examples have been described. These and other examples are within the scope of the following claims.

The invention claimed is:

1. A method comprising:
   generating, by a computing device, a hash ring that includes a plurality of buckets, wherein a non-zero subset of the plurality of buckets each includes a different output value of a plurality of output values, and a remaining subset of the plurality of buckets each includes an empty value;
   replacing, by the computing device, the empty value in each of the remaining subset of the plurality of buckets with the respective different output value of the plurality of output values, wherein the respective different output value includes a nearest adjacent output value from the different output values of the plurality of output values stored to the non-zero subset of the plurality of buckets in either a counterclockwise or clockwise traversal of the hash ring;
   receiving, by the computing device and after replacing the empty value in each of the remaining subset of the plurality of buckets, a key value;
   applying, by the computing device, a hash function to the key value to identify a bucket of the plurality of buckets; and
   outputting, by the computing device, the output value associated with the identified bucket.

2. The method of claim 1, wherein outputting the output value comprises outputting the output value that was replaced with the respective different output value.

3. The method of claim 1, wherein outputting the output value comprises outputting the output value without traversing any of the plurality of buckets of the hash ring.

4. The method of claim 1, wherein replacing the empty value in each of the remaining subset of the plurality of buckets includes:
   traversing the plurality of buckets of the hash ring to identify a bucket of the non-zero subset of the plurality of buckets that includes the different output value;
   determining whether a next bucket of the plurality of buckets adjacent to the bucket of the non-zero subset of the plurality of buckets that includes the different output value has the empty value; and
   replacing, responsive to determining the next bucket has the empty value, the empty value in the next bucket with the different output value.

5. The method of claim 4, wherein the next bucket is adjacent to the bucket of the non-zero subset of the plurality of buckets that includes the different output value when traversing the ring clockwise or counterclockwise.

6. The method of claim 1;
   wherein generating the hash ring comprises allocating a set amount of memory that does not change during application of the hash function; and
   wherein the hash function does not change during accesses of the hash ring.

7. The method of claim 1, further comprising:
   obtaining a new output value to be added to the plurality of update values;
   mapping the new output value to a bucket of the remaining subset of the plurality of buckets to replace the different output value associated with the bucket of the remaining subset of the plurality of buckets with the new output value;
   determining whether a next bucket of the plurality of buckets adjacent to the bucket of the remaining subset of the plurality of buckets has the different output value associated with the bucket of the remaining subset of the plurality of buckets; and
   replacing, responsive to determining the next bucket has the different output value associated with the bucket of the remaining subset of the plurality of buckets, the different output value associated with the bucket of the remaining subset of the plurality of buckets with the new output value.

8. The method of claim 1, further comprising:
   receiving an indication that a removed different output value of the plurality of different output values is to be removed; and
   replacing the removed different output value from a removed bucket of the non-zero subset of the plurality of buckets with the different output value from a bucket of the plurality of buckets that is adjacent to the removed bucket.

9. The method of claim 1;
wherein the computing device comprises a router;
wherein the key value is a destination address for a network flow; and
wherein the output value is a next hop.

10. A computing device comprising:
a memory configured to store a hash ring that includes a plurality of buckets, wherein a non-zero subset of the plurality of buckets each includes a different output value of a plurality of output values, and a remaining subset of the plurality of buckets each includes an empty value; and
one or more processors configured to:
replace the empty value in each of the remaining subset of the plurality of buckets with the respective different output value of the plurality of output values, wherein the respective different output value includes a nearest adjacent output value from the different output values of the plurality of output values stored to the non-zero subset of the plurality of buckets in either a counter-clockwise or clockwise traversal of the hash ring;
receive, after replacing the empty value in each of the remaining subset of the plurality of buckets, a key value;
apply a hash function to the key value to identify a bucket of the plurality of buckets; and
output the output value associated with the identified bucket.

11. The computing device of claim 10, wherein the one or more processors are configured to output the output value that was prepopulated with the respective different output value.

12. The computing device of claim 10, wherein the one or more processors are configured to output the output value without traversing any of the plurality of buckets of the hash ring.

13. The computing device of claim 10, wherein the one or more processors are configured to:
traverse the plurality of buckets of the hash ring to identify a bucket of the non-zero subset of the plurality of buckets that includes the different output value;
determine whether a next bucket of the plurality of buckets adjacent to the bucket of the non-zero subset of the plurality of buckets that includes the different output value has the empty value; and
replace, responsive to determining the next bucket has the empty value, the empty value in the next bucket with the respective different output value.

14. The computing device of claim 13, wherein the next bucket is adjacent to the bucket of the non-zero subset of the plurality of buckets that includes the different output value when traversing the ring clockwise or counterclockwise.

15. The computing device of claim 10;
wherein the one or more processors are configured to allocate a set amount of memory that does not change during application of the hash function, and
wherein the hash function does not change during accesses of the hash ring.

16. The computing device of claim 10, wherein the one or more processors are further configured to:
obtain a new output value to be added to the plurality of update values;
map the new output value to a bucket of the remaining subset of the plurality of buckets to replace the different output value associated with the bucket of the remaining subset of the plurality of buckets with the new output value;
determine whether a next bucket of the plurality of buckets adjacent to the bucket of the remaining subset of the plurality of buckets has the different output value associated with the bucket of the remaining subset of the plurality of buckets; and
replace, responsive to determining the next bucket has the different output value associated with the bucket of the remaining subset of the plurality of buckets, the different output value associated with the bucket of the remaining subset of the plurality of buckets with the new output value.

17. The computing device of claim 10, wherein the one or more processors are further configured to:
receive an indication that a removed different output value of the plurality of different output values is to be removed; and
replace the removed different output value from a removed bucket of the non-zero subset of the plurality of buckets with the different output value from a bucket of the plurality of buckets that is adjacent to the removed bucket.

18. The computing device of claim 10;
wherein the computing device comprises a router,
wherein the key value is a destination address for a network flow, and
wherein the output value is a next hop.

19. A network device comprising:
a plurality of interface cards;
a packet forwarding engine configured to:
store a hash ring that includes a plurality of buckets, wherein a non-zero subset of the plurality of buckets each includes a different output value of a plurality of output values that each identify a different one of the plurality of interface cards, and a remaining subset of the plurality of buckets each includes an empty value; and
replace the empty value in each of the remaining subset of the plurality of buckets with the respective different output value of the plurality of output values, wherein the respective different output value includes a nearest adjacent output value from the different output values of the plurality of output values stored to the non-zero subset of the plurality of buckets in either a counter-clockwise or clockwise traversal of the hash ring;
receive a packet;
apply a hash function to the packet to identify a bucket of the plurality of buckets; and
forward the packet to an interface card of the plurality of interface cards using the different output value stored to the identified bucket to load balance the packet across the plurality of interface cards.

* * * * *